United States Patent
Walsh

[11] 3,708,232
[45] Jan. 2, 1973

[54] OPTICAL READ-OUT MEANS FOR LOCATING AND POSITIONING OBJECTS WITH RESPECT TO A LASER BEAM REFERENCE

[76] Inventor: Robert R. Walsh, 2215 Baynard Blvd., Wilmington, Del. 19802

[21] Appl. No.: 72,703

[52] U.S. Cl. ..................356/172, 33/286, 172/4, 350/96 B
[51] Int. Cl. ...........................................G01b 11/26
[58] Field of Search......350/96 B; 250/227; 356/152, 356/138, 153, 154, 172; 33/46, 60, 74; 172/2, 4, 4.5

[56] References Cited

UNITED STATES PATENTS

| 3,244,894 | 4/1966 | Steele et al. | 350/96 B |
| 3,177,470 | 4/1965 | Galopin | 250/227 |
| 3,437,804 | 4/1969 | Schaefer et al. | 350/96 B |
| 3,448,276 | 6/1969 | Witte | 250/227 |
| 3,551,057 | 12/1970 | Hamilton et al. | 356/172 |
| 3,482,103 | 12/1969 | Martinsen | 172/4.5 |
| 3,494,426 | 2/1970 | Studebaker | 172/4.5 |
| 3,554,291 | 1/1971 | Rogers | 172/4.5 |
| 3,588,255 | 6/1971 | Alexander | 356/153 |

FOREIGN PATENTS OR APPLICATIONS

| 1,386,962 | 12/1964 | France | 350/96 B |
| 179,030 | 7/1966 | U.S.S.R. | 350/96 B |

OTHER PUBLICATIONS

"Light On The Run", Vector–Hughes Aircraft Co., Vol. VII No. 4, 1965, pp.10–13
Hinterberger et al., Rev. of Scientific Inst. Vol. 39, No. 8, 8/'68, pp. 1217–1218.

*Primary Examiner*—Ronald L. Wibert
*Assistant Examiner*—J. Rothenberg
*Attorney*—Birch and Birch

[57] ABSTRACT

A passive optical read-out device is provided for locating and positioning objects with respect to a fixed laser beam established in space as a parametric guideline. A plurality of fiber optic bundles extend from an input array to an output or read-out array with the ends of the individual bundles having the same relative position in each of the input and read-out arrays. A laser beam impinged on anyone of the ends of the fiber optic bundles in the input array will cause the corresponding output or read-out end of that same fiber optic bundle to glow brightly in the read-out array. This notifies the observer of the read-out array that a laser beam has impinged upon the input array and also advises the viewer as to the relative position of the beam on the input array.

3 Claims, 9 Drawing Figures

PATENTED JAN 2 1973 3,708,232
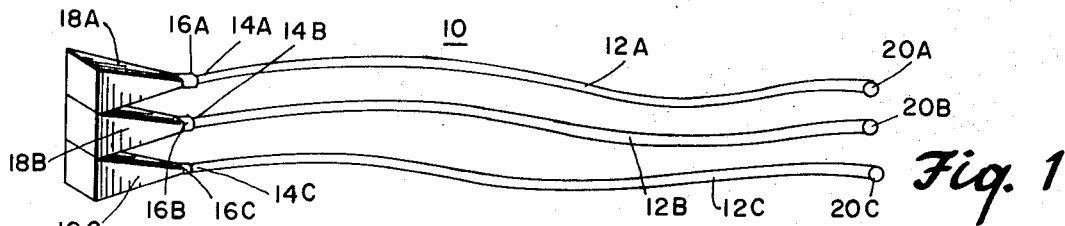
*Fig. 1*
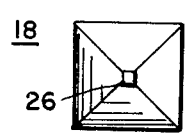
*Fig. 2*
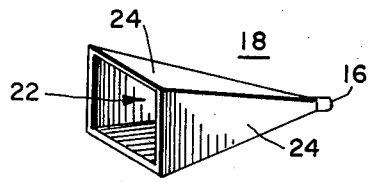
*Fig. 3*
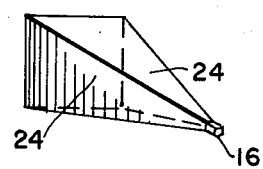
*Fig. 4*
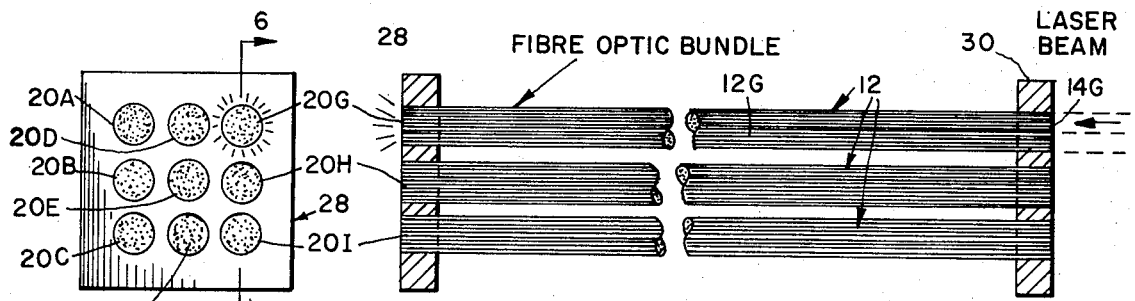
*Fig. 5*  *Fig. 6*
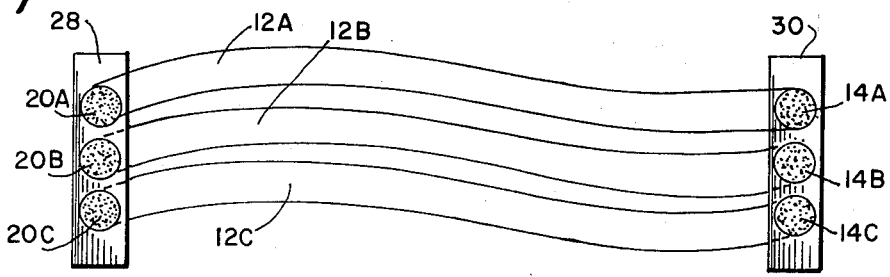
*Fig. 7*
INVENTOR
ROBERT R. WALSH
BY Birch & Birch
ATTORNEY

OPTICAL READ-OUT MEANS FOR LOCATING AND POSITIONING OBJECTS WITH RESPECT TO A LASER BEAM REFERENCE

This invention relates to means and apparatus for visual determination of the relative position of an object with respect to a laser beam which has been established in space as a straight line geometric reference defining a parameter of an excavation or object to be conformed to a given measurement. More specifically, the invention provides a viewing and target array which has a remote read-out capability and yet which permits, in effect, the safe direct coaxial viewing of the relative position of a laser beam and the object or means guiding thereon.

This invention is particularly adapted to facilitate the manual control of any means which is desired to be referenced to a fixed laser beam or the like. As an example, the control of a digging bucket of an automatic trenching machine by a laser beam in conjunction with the manual control of the trencher operator will now be described as presently practiced and contrasted to the new and unexpected facility with which this operation can be performed with the use of the present invention.

The use of a laser beam projected parallel to and at a certain distance above the desired invert line of a sewer pipe is well known in the pipe laying art. It would be extremely convenient, for example, if this same laser beam could be used to control the automatic digging machine or trencher, which normally precedes the installation of the sewer pipe by a few feet. This would enable the operator of the trencher to determine accurately the depth of cut of the trench as well as its direction, i.e., the relative position of the trench to the laser beam.

In current practice an approach to such a control of the trencher is presently made by use of a grade pole equipped with a flat foot for maintaining the grade pole in position on the bottom of the previously excavated trench. The length of the pole is designed to equal the desired depth of the trench from the laser beam, and the top of the pole is equipped with a translucent screen. The center of this screen is so positioned as to intercept the laser beam when the trench has been excavated to the correct depth and the foot of the pole is positioned on the floor of the trench.

Such an approach to manually controlled guidance of a trencher or the like is replete with problems. For example, safety considerations require that the brightness and power level of the laser beam be maintained at such a level as will not harm the human eye should it be accidentally stared into directly. As a result, when a laser beam of safe power level is impinged on a translucent screen, such as the one at the top of the grade pole, it becomes extremely difficult to see the beam on the screen because of the brightness of the ambient light. With such an arrangement, this lack of visibility can only be improved by bringing the line of sight of the observer of the target into coincidence with the line of projection of the laser beam as it impinges the target. Thus, if the viewer could look directly into the laser beam through the translucent viewing screen, the laser beam would appear at its maximum brightness and would be of ample brightness to be seen against even the brightest sunlight.

In practice however the achievement of such a relative position of the eye of the observer and the line of projection of the laser beam is rendered practically impossible. By way of illustration, the laser beam in a trenching and pipe laying operation cannot be raised above the pipe invert line to such an extent that the required length of a grade pole for detecting the presence of such a beam would be prohibitive. Accordingly, the normal relative position of the laser beam is such that it is below the line of sight of an operator sitting in the control cab of a trencher or backhoe.

Conceivably, photoelectric detectors placed at the reference point impinged by the laser beam on the digging machine could be utilized in conjunction with suitable amplifiers to drive an indicating device in the control cab for the purpose of showing the operator thereof the relative elevation of the trenching or digging bucket with respect to the laser beam. Such equipment has the obvious drawbacks of cost and complexity. To compound the problems, it is difficult to design detectors which are capable of distinguishing the light of the laser beam from the ordinary sunlight. This is particularly difficult if the sun is low on the horizon and substantially in line with the laser and the digging machine target.

With the present invention, however, a new, novel and extremely practical solution to these problems is provided. The translucent screen concept is completely eliminated and the operator of the trencher or the like is permitted, in effect, to look directly into the laser beam safely, thereby providing a visual read-out of maximum brightness.

It is, therefore, an object of this invention to provide a new and a novel laser beam detector and position read-out means.

It is another object of this invention to provide a new and novel laser beam detection and position read-out means which is constituted solely of passive optical elements wherein said passive optical elements comprise fiber optic bundles.

These and other objects of the present invention will become more fully apparent with reference to the following specification and drawings relating to a preferred embodiment of the invention.

In the drawings:

FIG. 1 is a schematic in perspective of a vertical array configuration of the present invention;

FIG. 2 is a front end view of an optical input terminal of the present invention;

FIG. 3 is a front perspective of the FIG. 2;

FIG. 4 is a rear perspective of FIG. 2;

FIG. 5 is a front plan view of a read-out array of another embodiment of the invention;

FIG. 6 is a cross section taken along lines 6—6 of FIG. 5;

FIG. 7 is a schematic of another embodiment of the present invention comprising a vertical array in which no optical input terminals are used.

Figure 8:
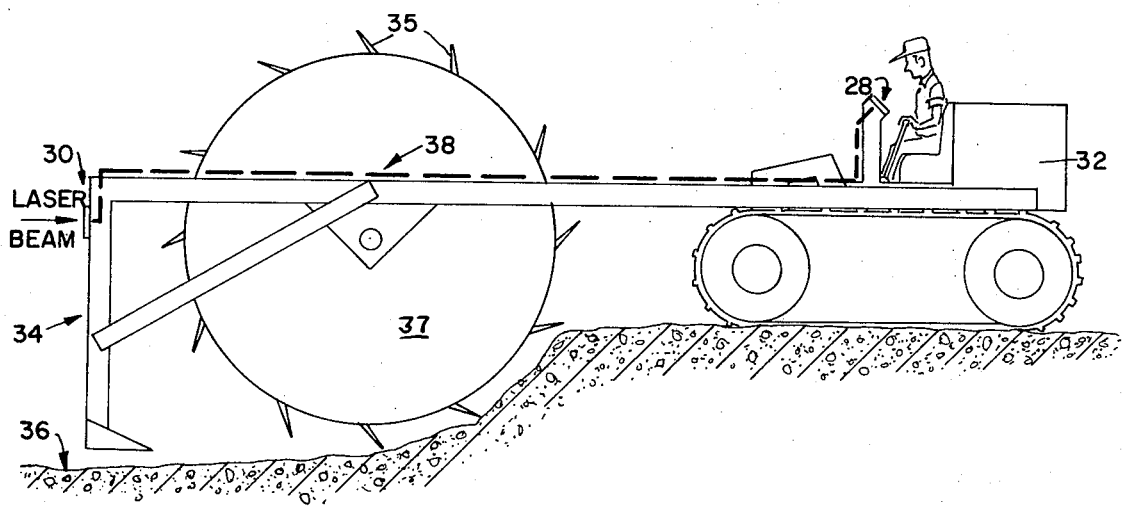
FIG. 8 is a schematic representation of the present invention mounted on a rotary trenching machine.

Basically the invention comprises a plurality of individual fiber optic bundles which extend from an input point to a read-out point. The input point or read end of each fiber optic bundle is positioned so as to be impinged by a laser beam, whereupon it will transmit the illumination caused by the impingement of such a beam to the read-out end of the same bundle. At this point the eye of an observer can visually detect the fact of such an impingement.

If a plurality of such bundles are placed in a predetermined array, such that the input ends thereof are arranged in like manner to the read-out ends thereof, the relative position between a central index or reference bundle end can be determined at the read-out array by mere visual observation. Direct viewing of laser beams in this manner is permitted by the very nature of the fiber optic bundles. Such bundles which are commercially available and which are not designed to produce images but merely to transmit light include a multiplicity of longitudinally disposed fibers which are oriented in random fashion. Light propagates through each fiber in the bundle by random, multiple total internal reflection from the inside of the fiber wall. Accordingly, the laser light or illumination from the laser beam is not emitted from the read-out end of the bundles in collimated coherent form. To the contrary, it is scattered immediately at the obverse surface of the read-out display, thereby precluding the impingement upon the human eye of a beam of such character as would harm the eye, but without substantial loss of the apparent brightness of the original laser beam.

In certain applications, it may be necessary or desirable to utilize optical input terminals to assist in gathering or directing the laser beam into the input array. If so, a symmetrically shaped optical input terminal provided with quick disconnect couplings may be attached to the end of each fiber optic bundle.

The qualitative nature of any read-out array of the present invention will be determined by the diameter of the impinging laser beam, the diameter of each fiber optic bundle. and the relative spacing between such bundles in the array. For example, if the optic bundles are of the same diameter as the laser beam and are spaced at a distance not greater than the diameter of said beam from one another, then the position of the laser beam can be visually observed at all times with respect to any given optic bundle in the array, including the reference bundle or center point.

Both the fiber optic bundles and the optical input terminals of the present invention comprise components known in the art as light pipes, i.e., devices having sufficient internal reflectivity to transmit light therethrough with a minimized loss in apparent intensity at the output end thereof.

Referring in detail to the drawings, and in particular to FIG. 1, the system 10 of the present invention is shown as comprising a plurality of fiber optic bundles 12A, 12B and 12C, which in this embodiment, are arranged in a vertical stack.

The input ends 14A, 14B and 14C, respectively, of the fiber optic bundles 12A, 12B and 12C are coupled to the output ends or quick coupling means 16A, 16B and 16C of respectively associated optical input terminals 18A, 18B and 18C. The read-out ends of the fiber optics 12A, 12B and 12C are designated as 20A, 20B and 20C, respectively.

Referring jointly to FIGS. 2, 3 and 4, an optical input terminal 18 of the present invention will now be described. Each optical input terminal is shown as having a rectangular entry window or input window 22 which is the surface of the optical terminal that is to be impinged by an incoming laser beam. The optical terminal 18 is a symmetrical funnel shape such as that of a pyramid, bounded by highly polished and internally reflective side surfaces 24 extending from the boundaries of the entry window 22 convergently to the quick connect coupling 16 at the output or rear-most point of the optical input terminal 18. A highly polished exit window 26 (see FIG. 2) is provided at the rear-most part of the optical input terminal 18 immediately adjacent the quick disconnect coupling 16 thereon. All of the light gathered by the input or entry window 22 is funneled through the optical input terminal 18 by internal reflection from the highly polished side walls 24 and is transmitted through the highly polished exit window 26 into the respectively associated fiber optical bundle attached thereto by the quick disconnect coupling 16.

The optical input terminal 18 can be made from an expanded bundle of fiber optics; from a properly designed block of glass or lucite; or from sheet metal having highly reflective interior surfaces.

Referring next to FIGS. 5 and 6, a nine bundle array of fiber optic bundles is shown to illustrate the degree of coordinate beam location which can be effectuated by the present invention. For example, in FIG. 5, the leftmost column of read-out ends 20A, 20B, and 20C of fiber optic bundles 12A, 12B and 12C of the previous embodiment can be supplemented by two additional like columns of fiber optic bundles 12 to provide a central column 20D, 20E and 20F and a right-hand column 20G, 20H and 20I.

In this array the center most exit end 20E of the plurality of fiber optic bundles 12 would be the reference point or center of the read-out array.

As shown in FIG. 6, the read-out array includes a read-out panel 28 through which the exit or read-out ends 20G, 20H and 20I are mounted, extending from the read of the read-out panel 28 to the obverse surface thereof so that visual observation of the exit ends 20 is possible.

As further shown in FIG. 6, the optical input terminals 18 may be dispensed with in some applications and an additional mounting or input panel 30 can be provided at the read or input ends of the fiber optic bundles 12. Each of the bundles 12 is to be mounted in exactly the same relative orientation in the input panel 30 as it will assume in the mounting panel 28.

Thus, should a laser beam be impinged upon the read or entrance end 14G of the fiber optic bundle 12G the read-out end 20G thereof will transmit an aura of illumination to the viewer of the read-out array of FIG. 5 as shown.

Referring now to FIG. 7 a vertical stack array similar to the embodiment of FIG. 1 is shown with the optical input terminals removed and which includes read-out and input mounting plates 28 and 30 such as disclosed in the embodiment of FIGS. 5 and 6. This illustrates the interchangeability of the various components previously described with respect to FIGS. 1 – 6, inclusive.

Figure 8A:
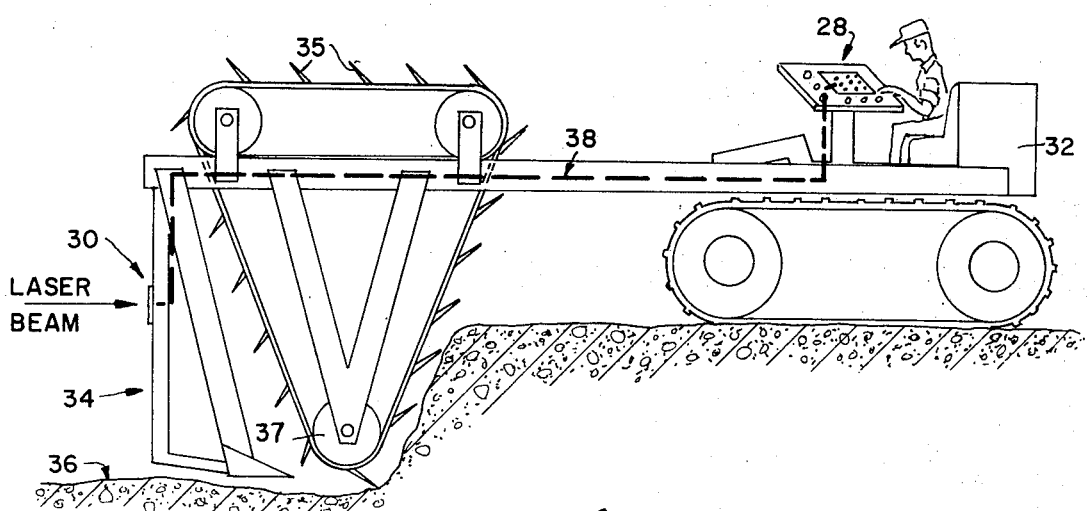
FIG. 8a is a schematic representation of the present invention mounted on a belt-type trenching machine.

Referring next to FIGS. 8 and 8A, a system as illustrated in FIGS. 5 and 6 is shown mounted on two types of trenchers 32. The input panel array 30 is shown mounted on the crumbing shoe 34 of the trencher 32 such that the input end 14E of the center-most fiber optic bundle 12E, when impinged by the laser beam L projected at a given distance above the bottom 36 of a trench T by laser generating means well known in the art, will constrain the digging buckets 37 to excavate the trench T to the proper depth and line defined by the laser beam L for the bottom 36 of the trench T.

In other words, the operator of the trencher 32 can visually determine by observing the read-out display panel 28 that the input end 14E of the fiber optic bundle 12E has been impinged by the laser beam L. Then, he need merely control the depth of the digging buckets 37 by means ordinarily provided on the machine to maintain this impingement, thus leaving the trench bottom 36 at the proper depth, grade and line determined by the laser beam L.

In observing the exit ends 20 of the fiber optic bundles 12, the operator of the trencher 32 is effectively looking right into the laser beam L and therefore sees the same at maximum brightness. With ordinary optics this could be an extremely hazardous situation since the highly coherent beam of laser light could very easily produce eye damage over an extended period of time. However, the mechanism by which the fiber optics bundle 12 transmits the light so scatters and disorganizes the light through the numerous internal reflections that occur and through the random disposition of the individual optical fibers within the bundle 12, that the light exiting from the exit ends 20 of the fiber optics bundles 12 is no longer coherent. Over the short distance from the fiber optic read-out display to the operator's eye, however, the light loses very little of its brilliance. Furthermore, it has a characteristic color clearly different from that of ambient sunlight. Therefore, even in extremely bright sunlight it is very easy for the operator to detect the impingement of the laser beam on one of the input ends 14 of the fiber optic bundles 12. This is vividly displayed to the operator both by the brightness of the respectively associated exit end 20 of the particular fiber optic bundle as well as the distinctive color of the laser light.

As a further example of the operation of the present invention reference is now made to FIGS. 7, 8 and 8A. Assuming that the input mounting plate 30 is positioned on the crumbing shoe 34 and that a laser beam reference has been established in the trench T, illumination of the exit end 20A of the fiber optic bundle 12A conveys to the operator of the trencher 32 the fact that the laser beam L has impinged upon the entrance or input end 14A of that fiber optic bundle and accordingly, that the reference point 14B, i.e., the centermost input end of the center-most optic bundle 12B is below the desired elevation to which the digging buckets 37 must be constrained prior to taking a bite from the bottom of the trench T. Therefore, the operator of the trencher 32 will constrain the digging buckets 37 to be elevated until such time as the reference read-out end 20B on the display panel 28 is illuminated. It is at this point that the operator of the trencher 32 knows that the digging buckets 37 are in the proper position at which a bite from the trench T will result in a trench bottom surface 36 at the proper line and grade and elevation as determined by the fixed laser beam L.

In each of the embodiments of FIGS. 1, 5, 6 and 7, there is disclosed a plurality of fiber optic bundles 12 extending from an input array to an output or read-out array. Because of the individual light transmitting capabilities of each individual fiber optic bundle 12, there is no constraint placed upon the relative position of such bundles between the respective input and read-out arrays. Accordingly, this plurality of fiber optic bundles 12 may be placed into a common cable sheath 38 which is illustrated in FIGS. 8 and 8A. This cable sheath 38 and its contained multiplicity of fiber optic bundles 12 is flexible and compliant and may be tortuously extended from the input array 30 to the read-out array 28 such as shown in FIG. 8. In fact, the individual fiber optic bundles 12 may even be braided into a multi-strand cable if desired.

This permits the laser beam detecting and position determining device of the present invention to be utilized around corners and from other inaccessible positions with respect to the actual location of the laser beam and yet, still, in effect, permit direct in-line viewing of the beam by the observer.

From the foregoing specification and drawings it can now readily be seen that the present invention provides new and novel laser beam detecting and position determining device which satisfies a long felt need in the art for effecting predetermined positioning of objects with respect to such beams. Furthermore, the present invention provides such a device which is constituted entirely of passive optical elements which preclude damage to the eye of an observer utilizing the device.

WHAT IS CLAIMED:

1. Means for remotely locating and positioning objects with respect to a fixed parametric guideline comprising:

means generating and projecting a laser beam in space to define a parametric guideline;

an object to be positioned with respect to said guideline;

optical means mounted on said object and having a reference index therein at a know relative orientation therewith; and remote control means for positioning said object such that said reference index is impinged by said laser beam when said object is properly positioned with respect to said guideline; said optical means comprising at least one elongated fiber optic bundle having an input end and an output end, said input end comprising said reference index and said bundle extending from said object to a point at which said output end thereof is adjacent said remote control means;

said optical means further including a plurality of said elongated fiber optic bundles having input and output ends substantially coterminate with said one bundle;

said input ends being arranged in a predetermined array about said reference index and said output ends being arranged in a like array about the output end of said one bundle adjacent said control means; each of said plurality of bundles, when its respective input end is impinged by said laser beam, transmitting said illumination of said laser beam to its respective output end in like manner to said one bundle to provide a visual display at said control means of the relative position of said laser beam and said reference index;

each said bundle comprising a plurality of coterminate optical fibers in random relative orientation;

said input ends being impinged by said laser beam when said object is properly referenced to said guideline; and said fiber optic bundles transmitting the illumination of said laser beam to said output ends with the same apparent brightness as a direct in-line viewing of said beam at said input ends and precluding collimated coherent emission of said illumination at said output ends, thereby providing a visual indication at said control means of said proper reference of said object to said guideline.

2. The invention defined in claim 1, wherein said optical means further includes optical input terminal means on said input ends of said fiber optic bundles;

said input terminal means comprising divergent, internally reflective light directing funnel means having a light receiving face removed from and of greater area than said input ends of said bundles for impingement by a laser beam.

3. The invention defined in claim 2, wherein said funnel means comprises a plurality of like funnels associated one with each of said input ends; said funnels each including a light directing optical surface substantially coextensive with and adjacent to the said input end with which it is associated.

* * * * *